United States Patent [19]

Heron et al.

[11] Patent Number: 5,435,199
[45] Date of Patent: Jul. 25, 1995

[54] HAND-BRAKE LEVER

[75] Inventors: Jacky Heron, Houilles; Philippe Ponceau, Le Perry En Yvelines, both of France

[73] Assignee: Regie Nationale Des Usines Renault, Boulogne Billancourt, France

[21] Appl. No.: 193,861

[22] Filed: Feb. 9, 1994

[30] Foreign Application Priority Data

Feb. 9, 1993 [FR] France ................. 93 01394

[51] Int. Cl.⁶ .............. F16J 15/50; G05G 1/00; G05G 1/04
[52] U.S. Cl. ........................ 74/18.1; 74/18; 74/566; 74/557; 74/523
[58] Field of Search ............. 74/18, 18.1, 560, 561, 74/558, 563, 566

[56] References Cited

U.S. PATENT DOCUMENTS

| | | | |
|---|---|---|---|
| 3,897,849 | 8/1975 | Mossner et al. | 74/18 |
| 4,793,620 | 12/1988 | Karch | 74/566 X |
| 4,817,968 | 4/1989 | Fischle | 74/18.1 X |
| 4,991,457 | 2/1991 | Chen | 74/18 |
| 5,016,485 | 5/1991 | Kato | 74/18.1 |

FOREIGN PATENT DOCUMENTS

| | | | |
|---|---|---|---|
| 0212664 | 3/1987 | European Pat. Off. | |
| 2504475 | 10/1982 | France | 74/18 |
| 2804604 | 7/1979 | Germany . | |
| 2079903 | 1/1982 | United Kingdom | 74/523 |

Primary Examiner—Vinh T. Luong
Attorney, Agent, or Firm—Oblon, Spivak, McClelland, Maier, & Neustadt

[57] ABSTRACT

A hand brake lever in a vehicle includes a stationary support mounted in a passenger compartment of the vehicle and having a mounting slot. A sound insulating material covers at least a portion of the stationary support, the sound insulating material defining a sealing surface surrounding the mounting slot. A brake lever member having a handle is pivotally mounted to the stationary support such that the handle extends through the mounting slot and into the passenger compartment. A lever base is mounted to the brake lever member and extends so as to cover an area above the sealing surface. The lever base has an elastic peripheral edge positioned so as to come into support contact with the sealing surface to seal the mounting slot when the brake lever member is pivoted to a brake release position. The sealing surface may be flexible and have a rectangular shape.

3 Claims, 1 Drawing Sheet

HAND-BRAKE LEVER

BACKGROUND OF THE INVENTION

1. Field of the Invention

This invention relates to an improved hand-brake lever mounted with hinge around a pin carried by a stationary support, at least one part of which carries a covering element.

2. Background of the Related Art

Hand-brake levers are generally provided with a sealing bellows or with a covering sleeve performing the function of a bellows as described in publication FR-A-2504475, or with a rigid casing integral with the lever and hinged on a stationary support as shown in publication EP-A-0212664.

SUMMARY OF THE INVENTION

An object of the present invention is to reduce significantly the propagation of sound waves by the hand brake during the use of the vehicle.

According to the invention, the above and other objects are achieved by a hand brake lever in a vehicle and including a stationary support mounted in a passenger compartment of the vehicle and having a mounting slot. A sound insulating material covers at least a portion of the stationary support, the sound insulating material defining a sealing surface surrounding the mounting slot. A brake lever member having a handle is pivotally mounted to the stationary support such that the handle extends through the mounting slot and into the passenger compartment. A lever base is mounted to the brake lever member and extends to cover an area above the sealing surface. The lever base has an elastic peripheral edge positioned so as to come into support contact with the sealing surface to seal the mounting slot when the brake lever member is pivoted to a brake release position.

The sealing surface may be flexible and have a rectangular shape.

BRIEF DESCRIPTION OF THE DRAWINGS

The understanding of this invention will be facilitated by the description of a preferred embodiment of such a hand-brake lever, with reference to the accompanying drawings in which.

DETAILED DESCRIPTION OF THE PREFERRED EMBODIMENT

Figure 1:
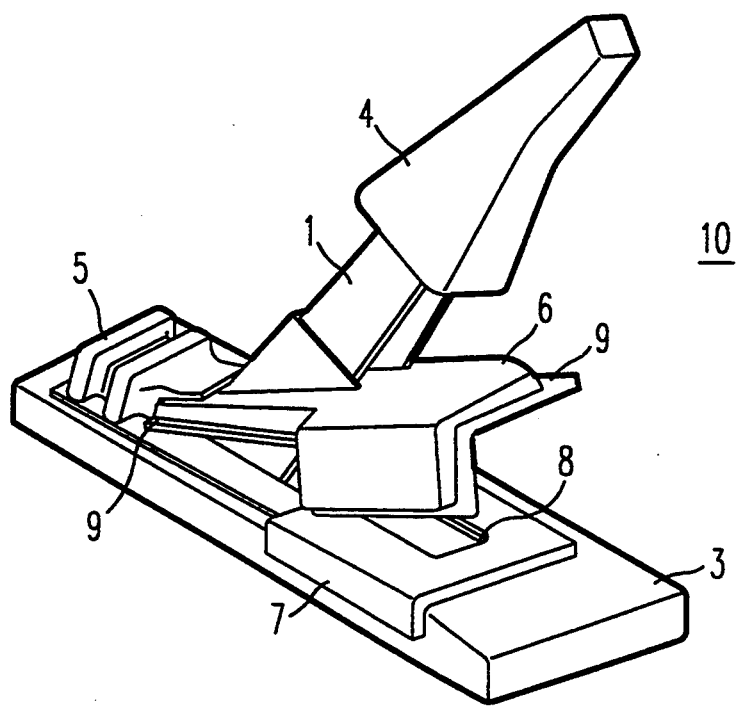
FIG. 1 is a view in perspective of the hand brake in an applied position.
Figure 2:
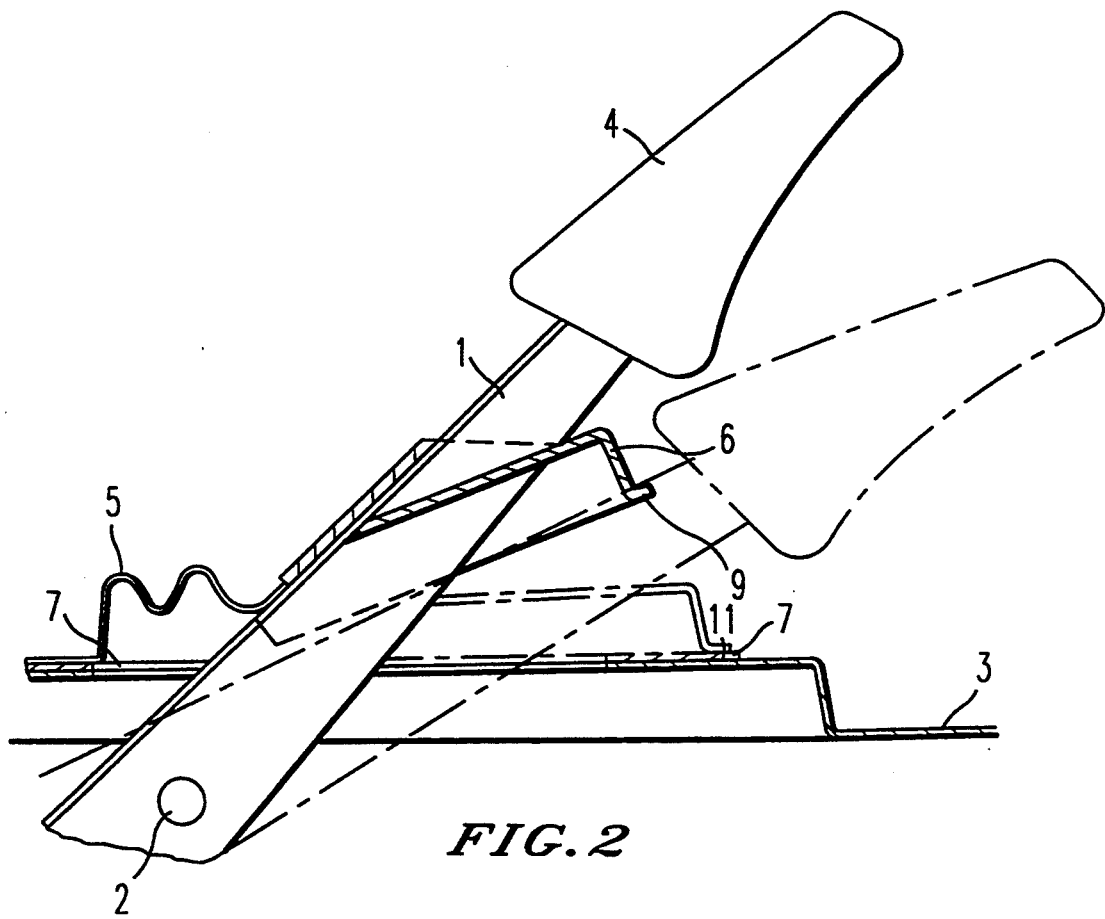
FIG. 2 is a view in longitudinal section of the hand brake shown in FIG. 1.

The hand-brake lever mounted in passenger compartment (10) of a vehicle and shown in FIGS. 1 and 2 comprises, in a way known in the art, a U-shaped lever (1) mounted with hinge around a pin (2) carried by a stationary support (3). The free end of the lever extends through a mounting slot (8) in the support and into the passenger compartment (10), and carries a handle (4). A bellows (5) provides the insulation between passenger compartment (10) and the subframe of the vehicle that carries pin (2). The sealing of the hinge is performed by a bellows (5).

According to the invention, base (6) of lever (1) extends lengthwise and crosswise above support (3) and more particularly above a zone ,consisting of a sealing surface (7) surrounding the mounting slot (S) in the support (3). By way of example, surface (7) has a rectangular shape. According to the embodiment of the invention, base (6) of the lever has a peripheral edge (9) intended to come in support contact with sealing surface (7) in released position of the brake (shown in chain lines in FIG. 1). Edge (9) is advantageously elastic. According to a characteristic of the mounting of the lever according to the invention, sealing surface (7) is made up of a sound insulating material (11) that at least partially covers support (3).

We claim:

1. A hand brake lever in a vehicle, comprising:
   a stationary support mounted in a passenger compartment of the vehicle and having a mounting slot;
   a sound insulating material covering at least a portion of said stationary support, said sound insulating material defining a sealing surface surrounding said mounting slot;
   a brake lever member having a handle and pivotally mounted to said stationary support such that said handle extends through said mounting slot and into the passenger compartment; and
   a lever base mounted to said brake lever member and extending so as to cover an area above said sealing surface, said lever base having an elastic peripheral edge positioned to come into support contact with said sealing surface to seal said mounting slot when said brake lever member is pivoted to a brake release position.

2. The hand brake lever of claim 1 wherein said sealing surface has a rectangular shape.

3. The hand brake lever of claim 1 wherein said sealing surface is flexible.

* * * * *